(12) United States Patent
Beam, III

(10) Patent No.: US 7,287,224 B2
(45) Date of Patent: Oct. 23, 2007

(54) OPERATION-ENABLING TRAINING AND SAFETY COMPUTER SYSTEM AND ASSOCIATED METHODS

(75) Inventor: Dennis A. Beam, III, Shelby, NC (US)

(73) Assignee: Reasonable Solutions, Inc., Shelby, NC (US)

( * ) Notice: Subject to any disclaimer, the term of this patent is extended or adjusted under 35 U.S.C. 154(b) by 639 days.

(21) Appl. No.: 10/170,814

(22) Filed: Jun. 13, 2002

(65) Prior Publication Data

US 2003/0231199 A1 Dec. 18, 2003

(51) Int. Cl.
*G06F 3/00* (2006.01)
(52) U.S. Cl. .................. 715/709; 715/771; 715/741; 434/323; 434/327; 345/172
(58) Field of Classification Search ................ 715/709, 715/771, 970, 705, 741, 743; 434/323, 322, 434/327, 335; 345/172; 700/83, 84
See application file for complete search history.

(56) References Cited

U.S. PATENT DOCUMENTS

| | | | | |
|---|---|---|---|---|
| 5,204,813 A | * | 4/1993 | Samph et al. ........... | 434/323 X |
| 5,704,029 A | * | 12/1997 | Wright, Jr. .............. | 345/173 X |
| 5,764,221 A | * | 6/1998 | Willard .................. | 345/173 |
| 6,083,007 A | * | 7/2000 | Joliat et al. ............ | 434/323 X |
| 2002/0065683 A1 | * | 5/2002 | Pham et al. ............ | 434/322 X |
| 2003/0077559 A1 | * | 4/2003 | Braunberger et al. ...... | 434/322 |

* cited by examiner

*Primary Examiner*—Raymond J. Bayerl
(74) *Attorney, Agent, or Firm*—Kilpatrick Stockton LLP

(57) ABSTRACT

An operation-enabling training and safety computer system and associated methods operable for selectively enabling and disabling a powered system including means for disabling the operation of the powered system, a display operable for presenting a user of the powered system with one or more questions related to training in the use of and safety associated with the powered system, one or more keys operable for transmitting one or more answers to the one or more questions from the user to the computer system, a processor operable for analyzing the one or more answers, and means for enabling the operation of the powered system if the one or more answers meet a set of predetermined criteria.

26 Claims, 4 Drawing Sheets

OPERATION-ENABLING TRAINING AND SAFETY COMPUTER SYSTEM AND ASSOCIATED METHODS

FIELD OF THE INVENTION

The present invention relates generally to the fields of training systems and safety devices. More specifically, the present invention relates to an operation-enabling training and safety computer system and associated methods.

BACKGROUND OF THE INVENTION

A variety of conventional pieces of machinery (such as chippers and pieces of manufacturing equipment), vehicles (such as automobiles, trucks, motorcycles, boats, and aircraft), powered systems (such as lawnmowers, snowblowers, and ovens), and the like perform self-diagnostic tests before their operation is enabled. For example, conventional pieces of machinery, vehicles, powered systems, and the like may perform self-diagnostic tests of fluid levels, operating temperatures, the presence of safety devices, and the like before their operation is enabled. This helps to ensure the operational safety of such powered systems.

However, the leading cause of injury associated with these powered systems is human error, referred to herein as operator/user error, caused by a lack of adequate safety training and a lack of familiarity with proper safety procedures. The adequacy of such safety training and the familiarity of an operator/user with proper safety procedures is often a central issue in injury-related investigations, disputes, and litigation.

Thus, what is needed is a system and associated methods that ensure that an operator/user has had adequate safety training and is familiar with proper safety procedures before he or she is allowed to operate a piece of machinery, a vehicle, a powered system, or the like which poses a significant risk of injury to the operator/user and/or others. What is needed is a system that is capable of selectively enabling/disabling the operation of a powered system depending upon the results of testing designed to determine the adequacy of the safety training and familiarity of the operator/user with proper safety procedures. What is also needed is a system that is capable of storing the results of this testing, either locally or remotely, and, optionally, issuing operator/user identification codes such that properly trained operators/users may circumvent subsequent testing. These operator/user identification codes must be secure if the overall training/safety goals of a manufacturer and/or an employer are to be achieved.

BRIEF SUMMARY OF THE INVENTION

Various embodiments of the present invention provide a system and associated methods that ensure that an operator/user has had adequate safety training and is familiar with proper safety procedures before he or she is allowed to operate a piece of machinery, a vehicle, a powered system, or the like which poses a significant risk of injury to the operator/user and/or others.

In one embodiment of the present invention, an operation-enabling training and safety computer system operable for selectively enabling and disabling a powered system includes means for disabling the operation of the powered system, a display operable for presenting a user of the powered system with one or more questions related to training in the use of and safety associated with the powered system, one or more keys operable for transmitting one or more answers to the one or more questions from the user to the computer system, a processor operable for analyzing the one or more answers, and means for enabling the operation of the powered system if the one or more answers meet a set of predetermined criteria.

In another embodiment of the present invention, an operation-enabling training and safety method for selectively enabling and disabling a powered system includes selectively disabling the operation of the powered system, presenting a user of the powered system with one or more questions related to training in the use of and safety associated with the powered system, receiving one or more answers to the one or more questions from the user, analyzing the one or more answers, and selectively enabling the operation of the powered system if the one or more answers meet a set of predetermined criteria.

DETAILED DESCRIPTION OF THE INVENTION

Figure 1:
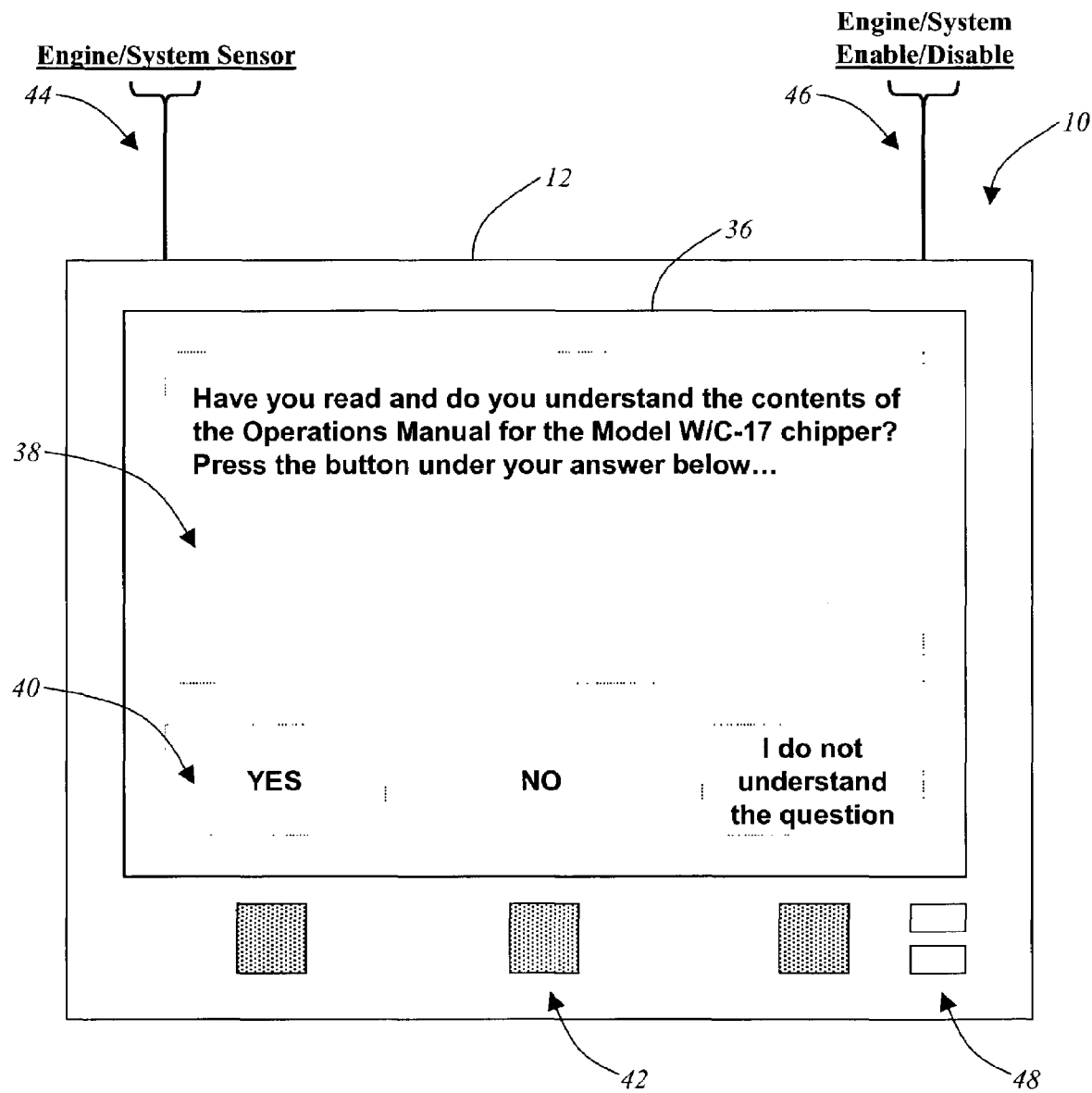
FIG. 1 is a schematic diagram of one embodiment of the operation-enabling training and safety computer system of the present invention, highlighting a hardkey/softkey configuration.
Figure 2:
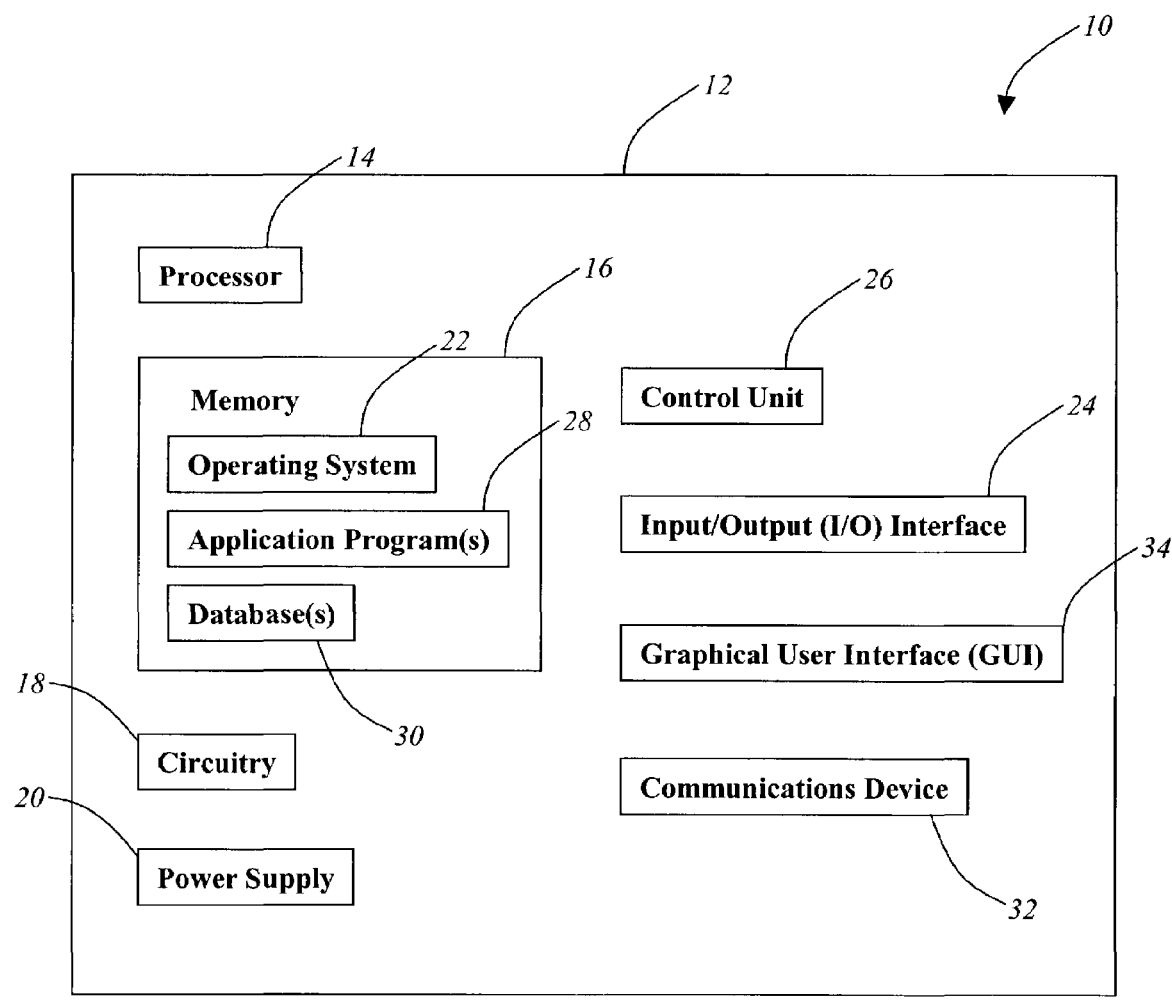
FIG. 2 is a schematic diagram of another embodiment of the operation-enabling training and safety computer system of the present invention, highlighting the internal components, modules, and algorithms associated therewith.

Referring to FIGS. 1 and 2, in one embodiment of the present invention, an operation-enabling training and safety computer system 10 includes a computer console 12 housing a processor 14, a memory 16, circuitry 18, and a power supply 20. The processor 14 may be, for example, a microprocessor, such as those manufactured by Advanced Micro Devices, Inc. (Sunnyvale, Calif.), Atmel Corporation (San Jose, Calif.), Dallas Semiconductor Corp. (Dallas, Tex.), Intel Corporation (Santa Clara, Calif.), International Business Machines Corp. (Armonk, N.Y.), Motorola, Inc. (Schaumburg, Ill.), Philips Semiconductors (Eindhoven, The Netherlands), Transmeta Corp. (Santa Clara, Calif.), and the like, which performs arithmetic and logic operations. The memory 16 may include, for example, a random-access memory (RAM), a read-only memory (ROM), a programmable read-only memory (PROM), an erasable programmable read-only memory (EPROM), and/or an electrically-erasable programmable read-only memory (EEPROM). Preferably, the memory 16 also includes an operating system 22 which executes on the processor 14. The operating system 22 includes a set of instructions which control the functions of the processor 14. For example, the operating system 22 may receive input from input devices (via an input/output (I/O) interface 24), send output to output devices (also via the I/O interface 24), keep track of directories and files, and control peripheral devices. Suitable examples of an operating system 22 include those provided by Apple Computer, Inc. (Cupertino, Calif.) and Microsoft Corporation (Redmond, Wash.), and Linux. The computer console 12 may also include a control unit 26 which extracts the set of instructions from the memory 16. The circuitry 18 is operable for connecting all of the components disposed within the computer console 12 together. The power supply 20 may include, for example, an alternating-current (AC)/direct-current (DC) power source, a battery, one or more solar cells, or the like.

Preferably, the memory 16 of the computer console 12 includes one or more application programs 28 operable for carrying out a plurality of functions. These functions may include issuing/receiving/accepting a plurality of user identification codes; storing the plurality of user identification codes in one or more local databases 30; presenting the user of a piece of machinery, a vehicle, a powered system, or the like with a plurality of questions related to training and/or safety; storing the results of the test(s) in the one or more local databases 30; transmitting the plurality of user identification codes and/or the results of the test(s) to one or more remote databases (not shown); and the like. Optionally, the plurality of user identification codes and the results of the test(s) are transmitted to the one or more remote databases via a communications device disposed within or associated with the computer console 12, such as a wireline communications device (e.g., a telephone and a modem), a wireless communications device (e.g., a cellular telephone and a modem), an Internet-protocol (IP) communications device, a Bluetooth-enabled communications device, an infrared transmission device, or the like.

Preferably, the computer console 12 is fixedly or removably attached to, or integrally formed with, a piece of machinery (such as a chipper or a piece of manufacturing equipment), a vehicle (such as an automobile, a truck, a motorcycle, a boat, or an aircraft), a powered system (such as a lawnmower, a snowblower, or an oven), or the like. A user of the piece of machinery, the vehicle, the powered system, or the like interacts with the computer console 12 and the operation-enabling training and safety computer system 10 via a graphical user interface (GUI) 34 and a display 36. The display 36 may be, for example, a light-emitting diode (LED) display, a liquid crystal display (LCD), a cathode ray tube display, or a plasma display. The display 36 is operable for presenting the user with the plurality of questions related to training and/or safety, instructions, warning messages, and a plurality of other messages. For example, in FIG. 1, a text field 38 of the display 36 presents the user with the following question: "Have you read and do you understand the contents of the Operations Manual for the Model W/C-17 chipper? Press the button under your answer below . . ."

A response field 40 of the display 36 also presents the user with a plurality of possible responses corresponding to a plurality of hardkeys/softkeys 42 or buttons. For example, in FIG. 1, the response field 40 of the display 36 presents the user with the following possible responses: "Yes," "No," and "I do not understand the question." Optionally, the position of each of the plurality of possible responses relative to each of the plurality of hardkeys/softkeys 42 or buttons may be varied each time a test is administered to a user, such that the position or sequence of the proper responses to a given series of questions may not be memorized.

The operation-enabling training and safety computer system 10 is programmable such that the plurality of questions presented to a user may be customized to correspond to a given piece of machinery, vehicle, powered system, or the like, and periodically updated. The plurality of questions may also be presented to the user in a random manner. The plurality of questions may further be presented to the user in a plurality of languages. For example, the text field 38 and the response field 40 of the display 36 may prompt the user to select "English" or "Spanish."

The operation-enabling training and safety computer system 10 also includes an engine/system sensor 44 operable for sensing whether or not the engine or power system associated with the piece of machinery, the vehicle, the powered system, or the like is currently operating. The operation-enabling training and safety computer system 10 further includes an engine/system enable/disable switch/relay 46 operable for selectively enabling and/or disabling the engine or power system associated with the piece of machinery, the vehicle, the powered system, or the like, depending upon the identity of the user and/or the results of a given test. Optionally, the operation-enabling training and safety computer system 10 further includes a plurality of indicator lights 48 (and/or indicator audio signals) operable for indicating whether or not the engine or power system associated with the piece of machinery, the vehicle, the powered system, or the like has been enabled or disabled.

Figure 3:
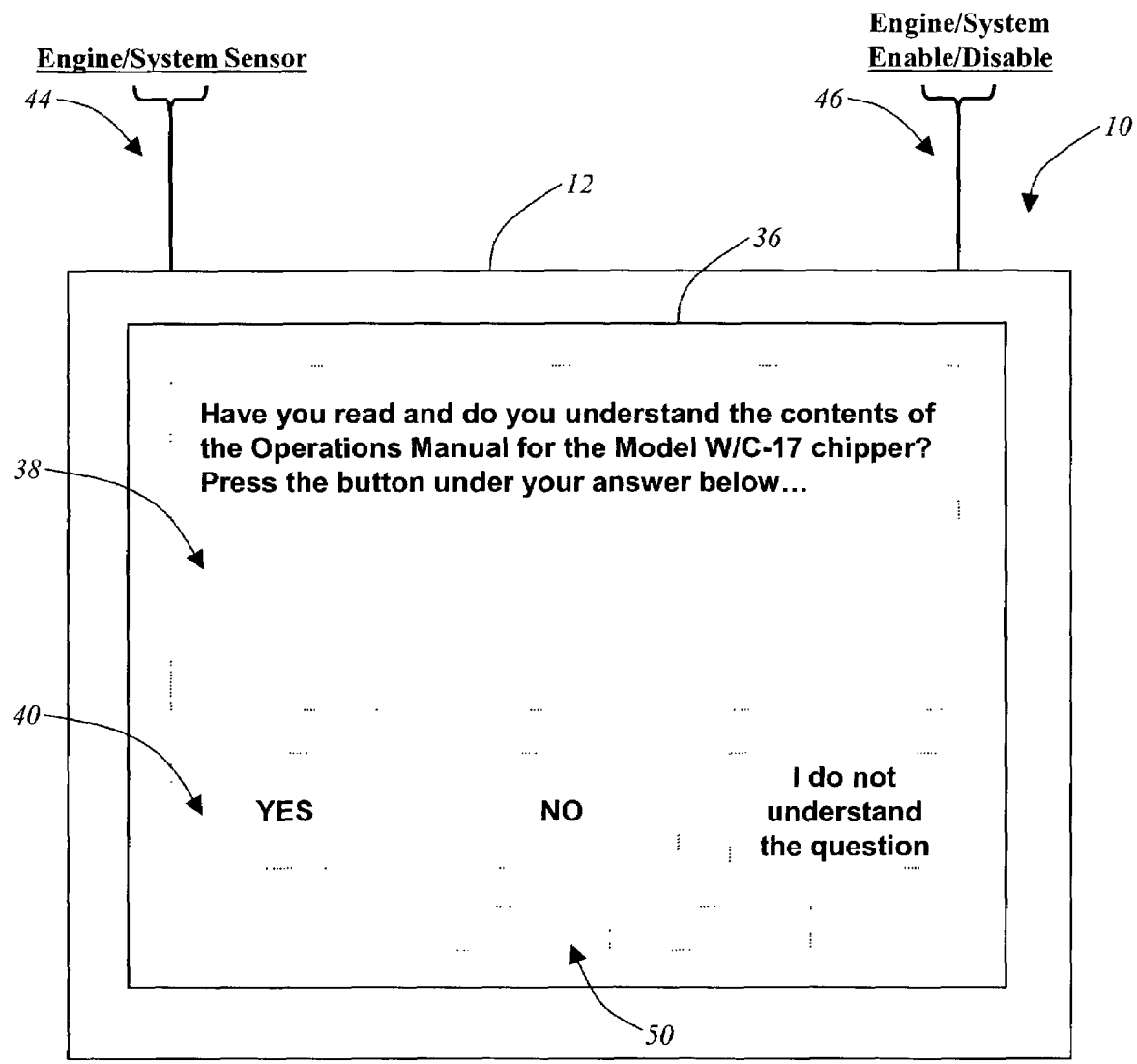
FIG. 3 is a schematic diagram of a further embodiment of the operation-enabling training and safety computer system of the present invention, highlighting a touch screen configuration.

Referring to FIG. 3, in another embodiment of the present invention, the response field 40 of the display 36 presents the user with a plurality of possible responses corresponding to a plurality of touch screen buttons 50, such as those present on a personal digital assistant (PDA) device. Again, the position of each of the plurality of possible responses relative to each of the plurality of touch screen buttons 50 may be varied each time a test is administered to a user, such that the position or sequence of the proper responses to a given series of questions may not be memorized. Preferably, the response field 40 of the display 36 also presents the user with a plurality of alphanumeric characters corresponding to the plurality of touch screen buttons 50. Optionally, these alphanumeric touch screen buttons 50 are used to enter a user identification code issued by one of the application programs 28 (FIG. 2) upon the successful completion of a given test by a user, i.e., once the user has demonstrated that he or she is properly trained in the operation of the piece of machinery, the vehicle, the powered system, or the like and/or understands the safety procedures associated with the piece of machinery, the vehicle, the powered system, or the like, to circumvent subsequent tests.

Figure 4:
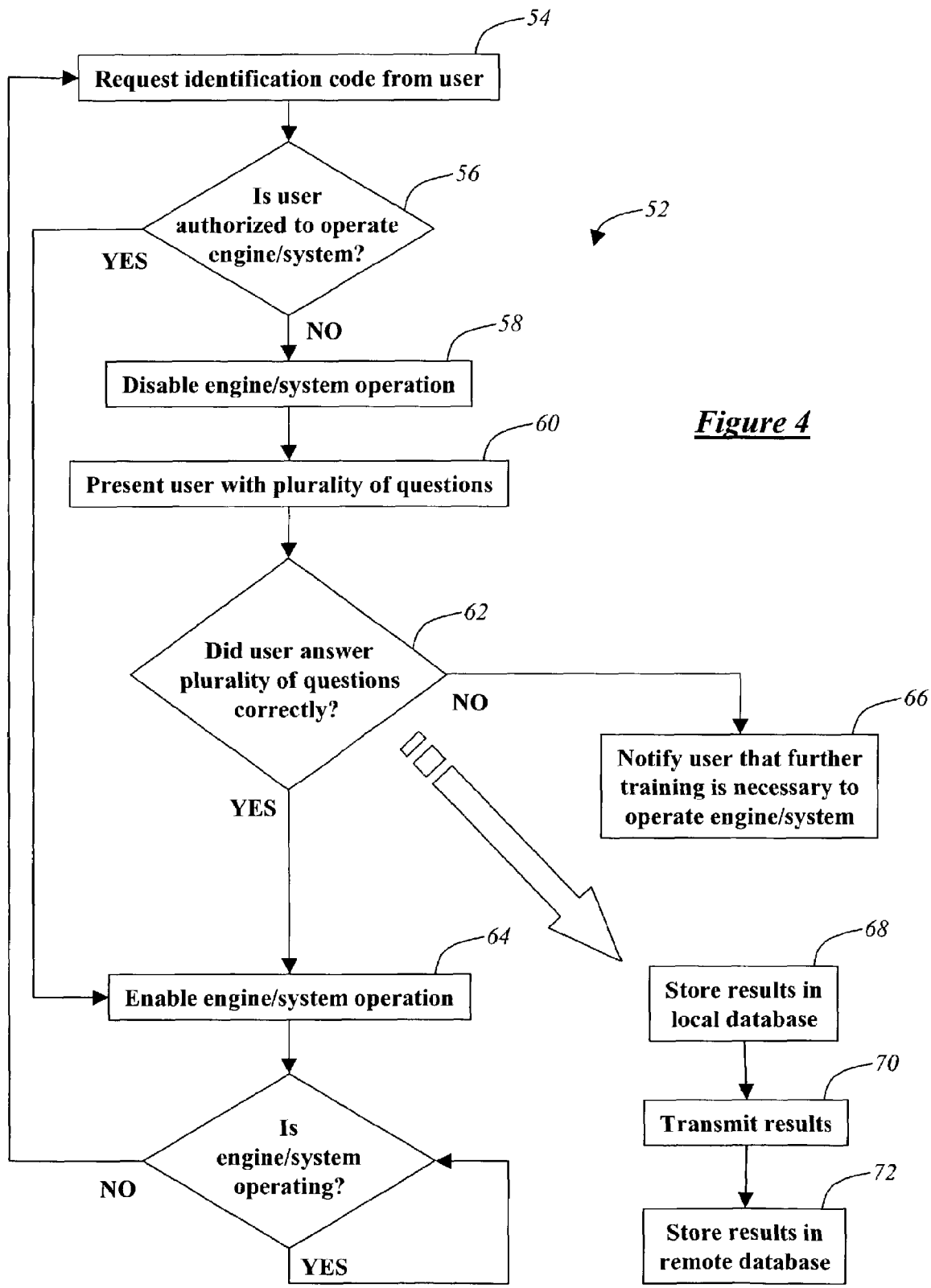
FIG. 4 is a flow chart of a further embodiment of the operation-enabling training and safety computer system and associated methods of the present invention.

Referring to FIG. 4, in a further embodiment of the present invention, a method 52 associated with the operation-enabling training and safety computer system 10 (FIGS. 1, 2, and 3) includes requesting and receiving a user identification code from a user (Block 54). A first algorithm determines whether or not the user is already authorized to operate the piece of machinery, the vehicle, the powered system, or the like (Block 56), i.e., whether or not the user, through previous testing or otherwise, has demonstrated that he or she is properly trained in the operation of the piece of machinery, the vehicle, the powered system, or the like and/or understands the safety procedures associated with the piece of machinery, the vehicle, the powered system, or the like. If the answer is "Yes," then the engine or power system associated with the piece of machinery, the vehicle, the powered system, or the like is electronically or mechanically enabled (Block 64). If the answer is "No," then the engine or power system associated with the piece of machinery, the vehicle, the powered system, or the like is electronically or mechanically disabled (Block 58) and the user is presented with a plurality of questions related to training and/or safety (Block 60). A second algorithm determines whether or not the user answers the plurality of questions related to training and/or safety correctly (Block 62). If the answer is "Yes"

(given a set of predetermined criteria), then the engine or power system associated with the piece of machinery, the vehicle, the powered system, or the like is electronically or mechanically enabled (Block 64). If the answer is "No" (given the set of predetermined criteria), then the engine or power system associated with the piece of machinery, the vehicle, the powered system, or the like is electronically or mechanically disabled (Block 58) and the user is notified that further training is necessary to operate the piece of machinery, the vehicle, the powered system, or the like (Block 66). For example, a user may have to indicate that he or she has read and understands the contents of an operations manual for the piece of machinery, the vehicle, the powered system, or the like in order for operation to be enabled. Alternatively, a predetermined percentage of correct responses may be required for a series of specific, targeted questions related to the operation of the piece of machinery, the vehicle, the powered system, or the like.

Optionally, the results of a given test or series of questions may be stored in a local database (Block 68) for a predetermined period of time, or may be transmitted to and stored in a remote database (Blocks 70 and 72) for a predetermined period of time.

In a further embodiment of the present invention, the operation-enabling training and safety computer system and associated methods may incorporate a clock/calendar, timer, or timing algorithm operable for keeping track of the date, day of the week, and/or time such that the operation of the piece of machinery, the vehicle, the powered system, or the like may be disabled on predetermined dates, on predetermined days of the week (e.g., on weekends), or at predetermined times. This allows an employer, for example, to prohibit employees from operating a piece of machinery, a vehicle, a powered system, or the like during unsupervised, non-work hours.

Although the operation-enabling training and safety computer system and associated methods of the present invention have been shown and described in relation to preferred embodiments and examples thereof, it will be readily apparent to those of ordinary skill in the art that other embodiments and examples may be utilized to perform similar functions and/or to achieve similar results to those of the present invention. For example, although the operation-enabling training and safety computer system and associated methods of the present invention have been shown and described in conjunction with chippers, pieces of manufacturing equipment, automobiles, trucks, motorcycles, boats, aircraft, lawnmowers, snowblowers, ovens, and the like, the operation-enabling training and safety computer system and associated methods of the present invention may be used in conjunction with any piece of machinery, vehicle, powered system, or the like. The following claims are intended to cover all such equivalent embodiments and examples.

What is claimed is:

1. An operation-enabling training and safety computer system operable for selectively enabling and disabling a powered system, the operation-enabling training and safety computer system comprising:
   means for disabling the operation of the entire powered system;
   a display operable for presenting a user of the powered system with one or more questions related to training in the use of and safety associated with the powered system;
   one or more keys operable for transmitting one or more answers to the one or more questions from the user to the computer system;
   a processor operable for analyzing the one or more answers; and
   means for enabling the operation of the entire powered system if the one or more answers meet a set of predetermined criteria.

2. The system of claim 1, wherein the means for disabling the operation of the entire powered system comprise means for electronically disabling the operation of the powered system.

3. The system of claim 1, wherein the means for disabling the operation of the entire powered system comprise means for mechanically disabling the operation of the powered system.

4. The system of claim 1, wherein the one or more keys operable for transmitting the one or more answers to the one or more questions from the user to the computer system comprise one or more hardkeys/softkeys.

5. The system of claim 1, wherein the one or more keys operable for transmitting the one or more answers to the one or more questions from the user to the computer system comprise one or more touch screen buttons.

6. The system of claim 1, further comprising a local database operable for storing the one or more answers.

7. The system of claim 6, further comprising a remote database operable for storing the one or more answers.

8. The system of claim 7, further comprising a communications system operable for transmitting the one or more answers from the local database to the remote database.

9. The system of claim 8, wherein the communications system comprises a wireline device in communication with a wireline network.

10. The system of claim 8, wherein the communications system comprises a wireless device in communication with a wireless network.

11. The system of claim 1, wherein the processor is operable for issuing a user identification code to the user if the one or more answers meet the set of predetermined criteria.

12. The system of claim 11, wherein the one or more keys are operable for transmitting the user identification code from the user to the computer system.

13. The system of claim 12, wherein the means for enabling the operation of the powered system are operable for enabling the operation of the powered system upon receiving the user identification code from the user.

14. An operation-enabling training and safety method for selectively enabling and disabling a powered system, the operation-enabling training and safety method comprising:
   selectively disabling the operation of the entire powered system;
   presenting a user of the powered system with one or more questions related to training in the use of and safety associated with the powered system;
   receiving one or more answers to the one or more questions from the user;
   analyzing the one or more answers; and
   selectively enabling the operation of the entire powered system if the one or more answers meet a set of predetermined criteria.

15. The method of claim 14, wherein selectively disabling the operation of the entire powered system comprises selectively electronically disabling the operation of the powered system.

16. The method of claim 14, wherein selectively disabling the operation of the entire powered system comprises selectively mechanically disabling the operation of the powered system.

17. The method of claim 14, wherein receiving the one or more answers to the one or more questions from the user comprises receiving the one or more answers to the one or more questions from the user via one or more hardkeys/softkeys.

18. The method of claim 14, wherein receiving the one or more answers to the one or more questions from the user comprises receiving the one or more answers to the one or more questions from the user via one or more touch screen buttons.

19. The method of claim 14, further comprising storing the one or more answers in a local database.

20. The method of claim 19, further comprising storing the one or more answers in a remote database.

21. The method of claim 20, further comprising providing a communications system operable for transmitting the one or more answers from the local database to the remote database.

22. The method of claim 21, wherein the communications system comprises a wireline device in communication with a wireline network.

23. The method of claim 21, wherein the communications system comprises a wireless device in communication with a wireless network.

24. The method of claim 14, further comprising issuing a user identification code to the user if the one or more answers meet the set of predetermined criteria.

25. The method of claim 24, further comprising receiving the user identification code from the user.

26. The method of claim 25, further comprising selectively enabling the operation of the powered system upon receiving the user identification code from the user.

* * * * *